Sept. 22, 1959   J. B. GLENNON ET AL   2,905,088
FIRING MECHANISM FOR A SUBMARINE MINE
Filed May 26, 1941   11 Sheets-Sheet 4

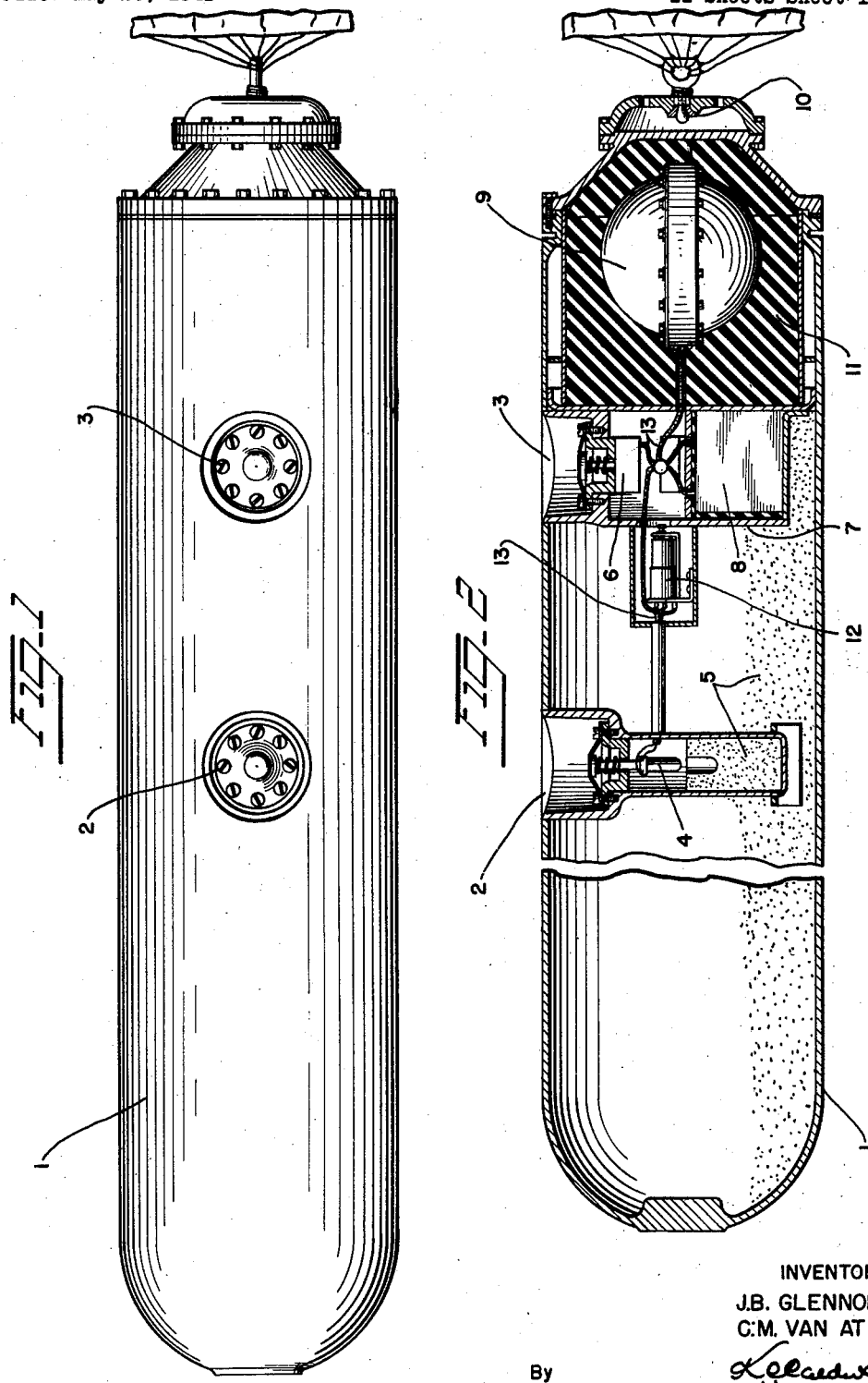
Sept. 22, 1959    J. B. GLENNON ET AL    2,905,088
FIRING MECHANISM FOR A SUBMARINE MINE
Filed May 26, 1941    11 Sheets-Sheet 1
INVENTORS
J.B. GLENNON
C.M. VAN ATTA
By
Attorney

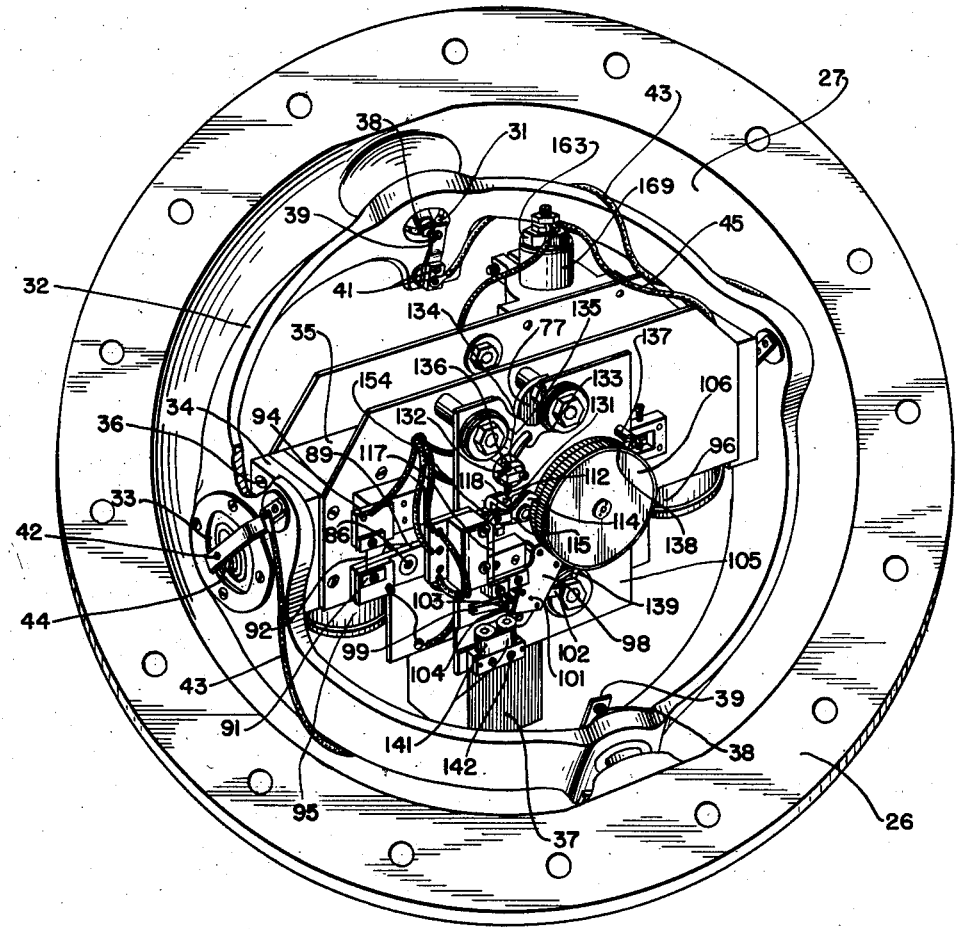

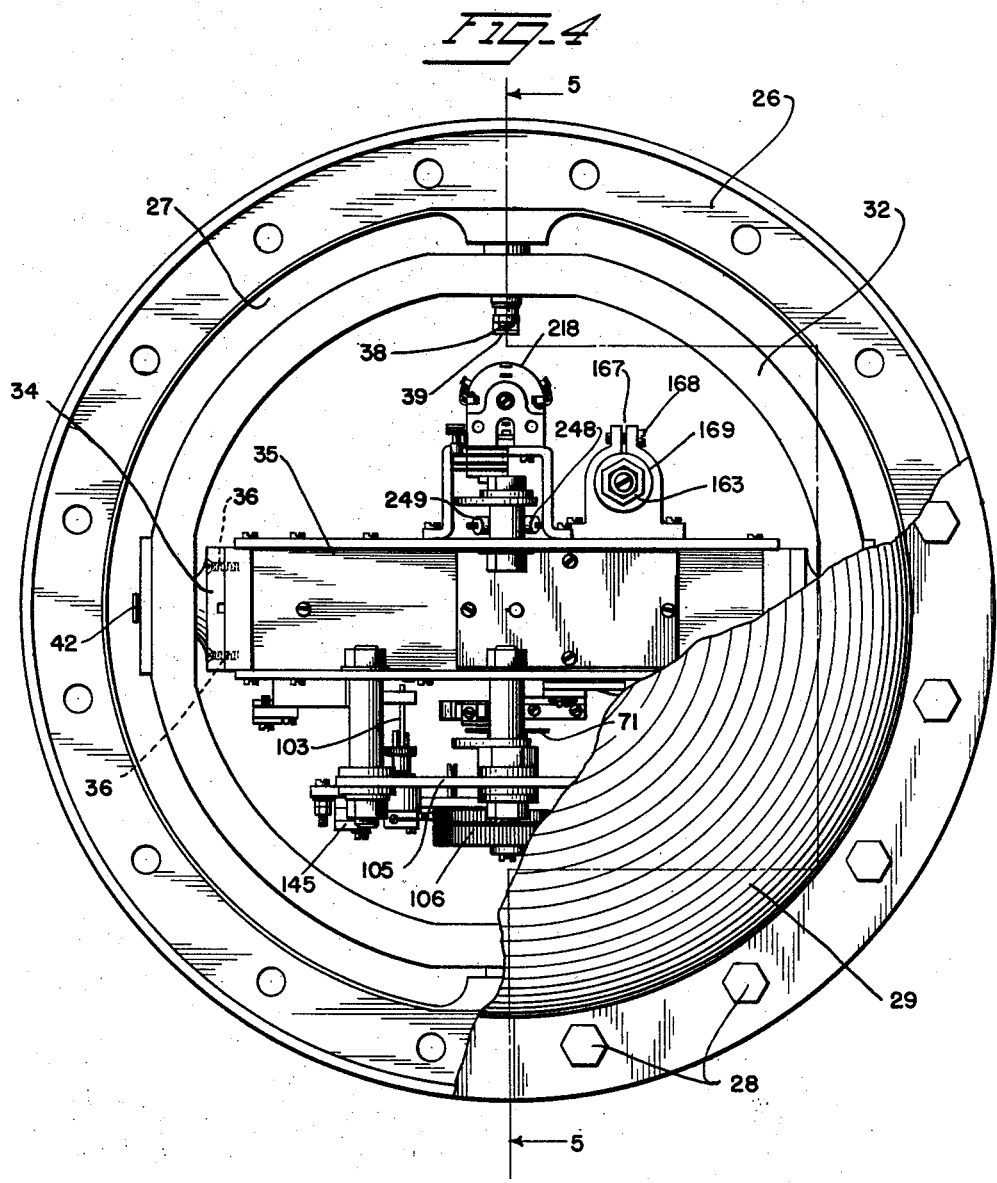

Inventors
J. B. GLENNON
C. M. VAN ATTA

By

Attorney

Sept. 22, 1959  J. B. GLENNON ET AL  2,905,088
FIRING MECHANISM FOR A SUBMARINE MINE
Filed May 26, 1941  11 Sheets-Sheet 5
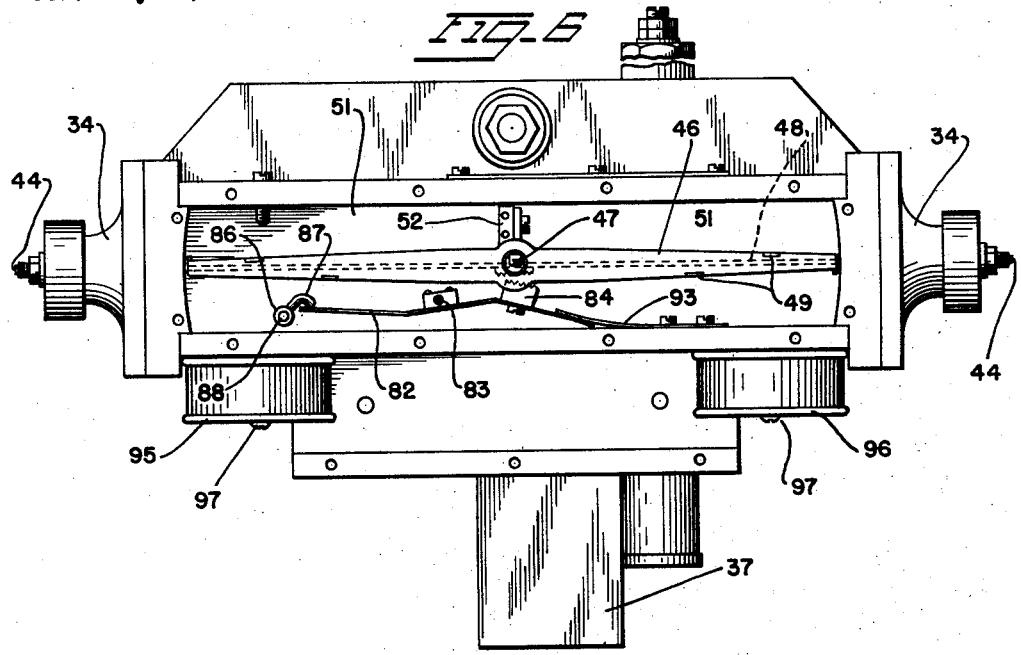
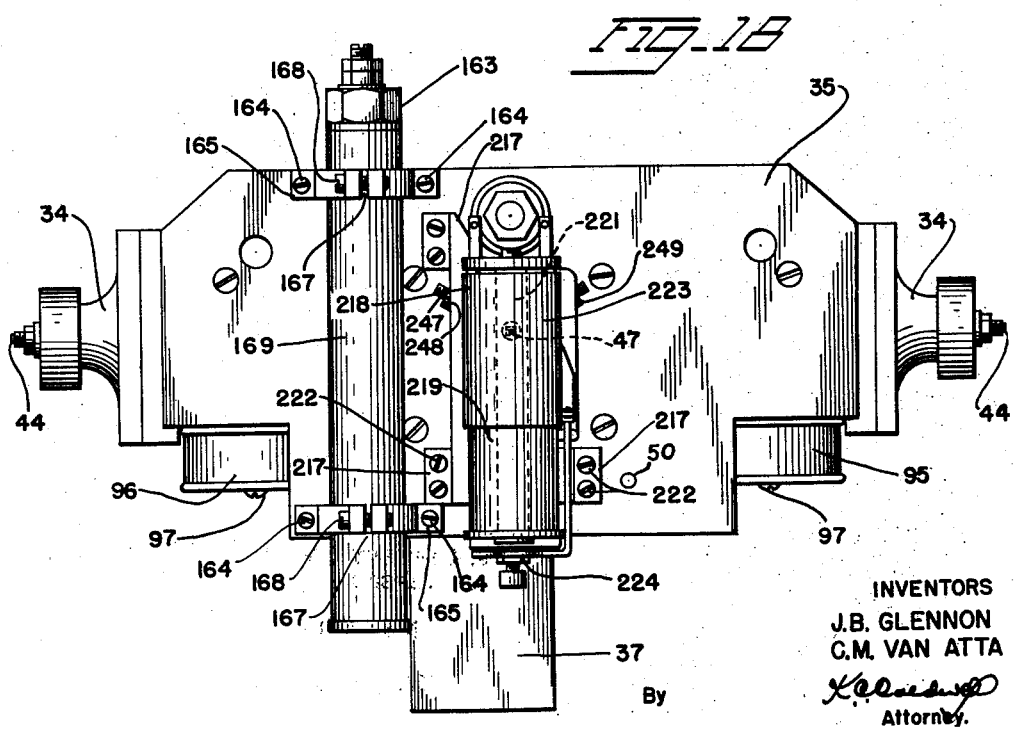
INVENTORS
J.B. GLENNON
C.M. VAN ATTA
By
Attorney.

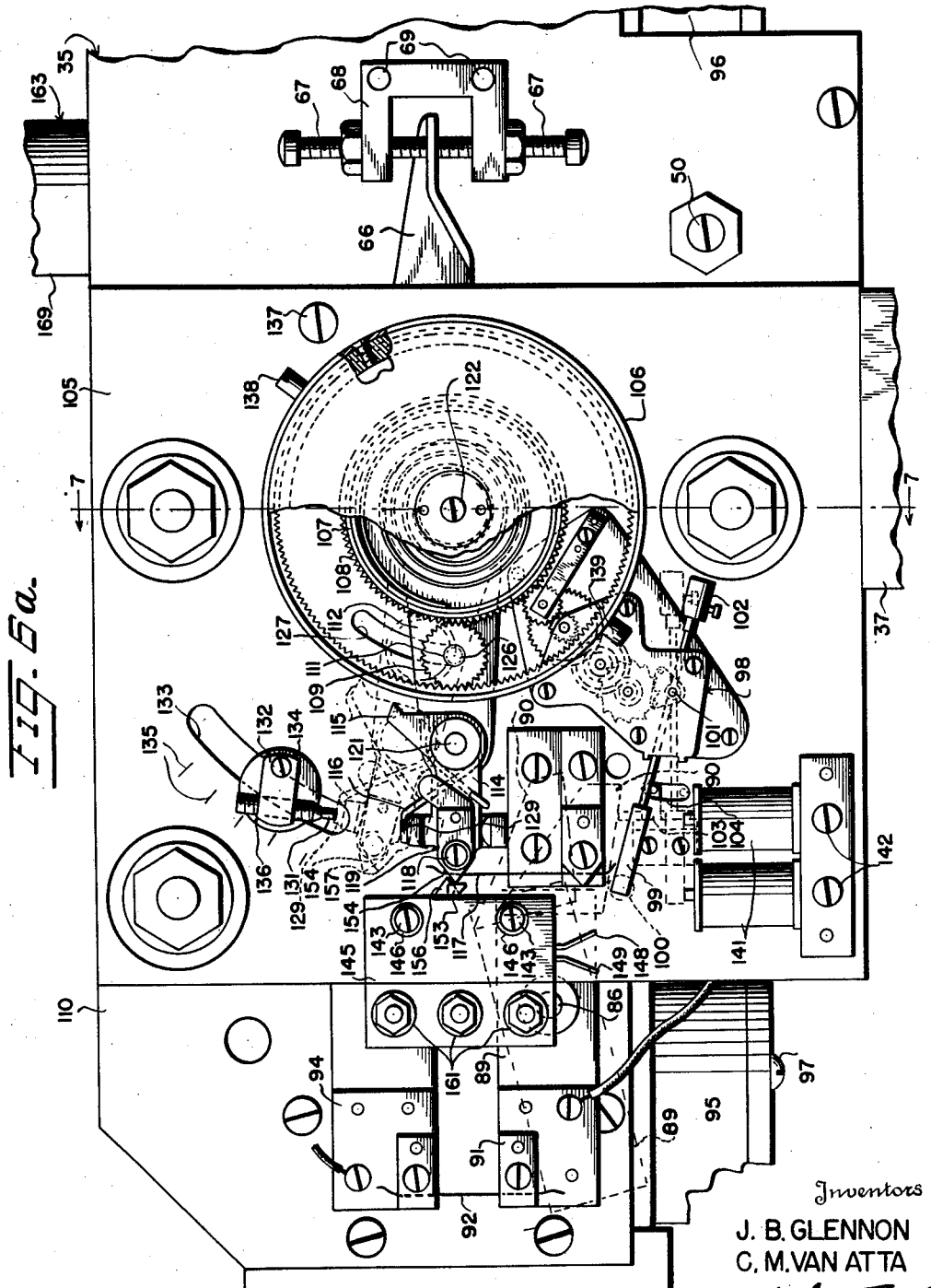

Sept. 22, 1959 J. B. GLENNON ET AL 2,905,088
FIRING MECHANISM FOR A SUBMARINE MINE
Filed May 26, 1941 11 Sheets-Sheet 7
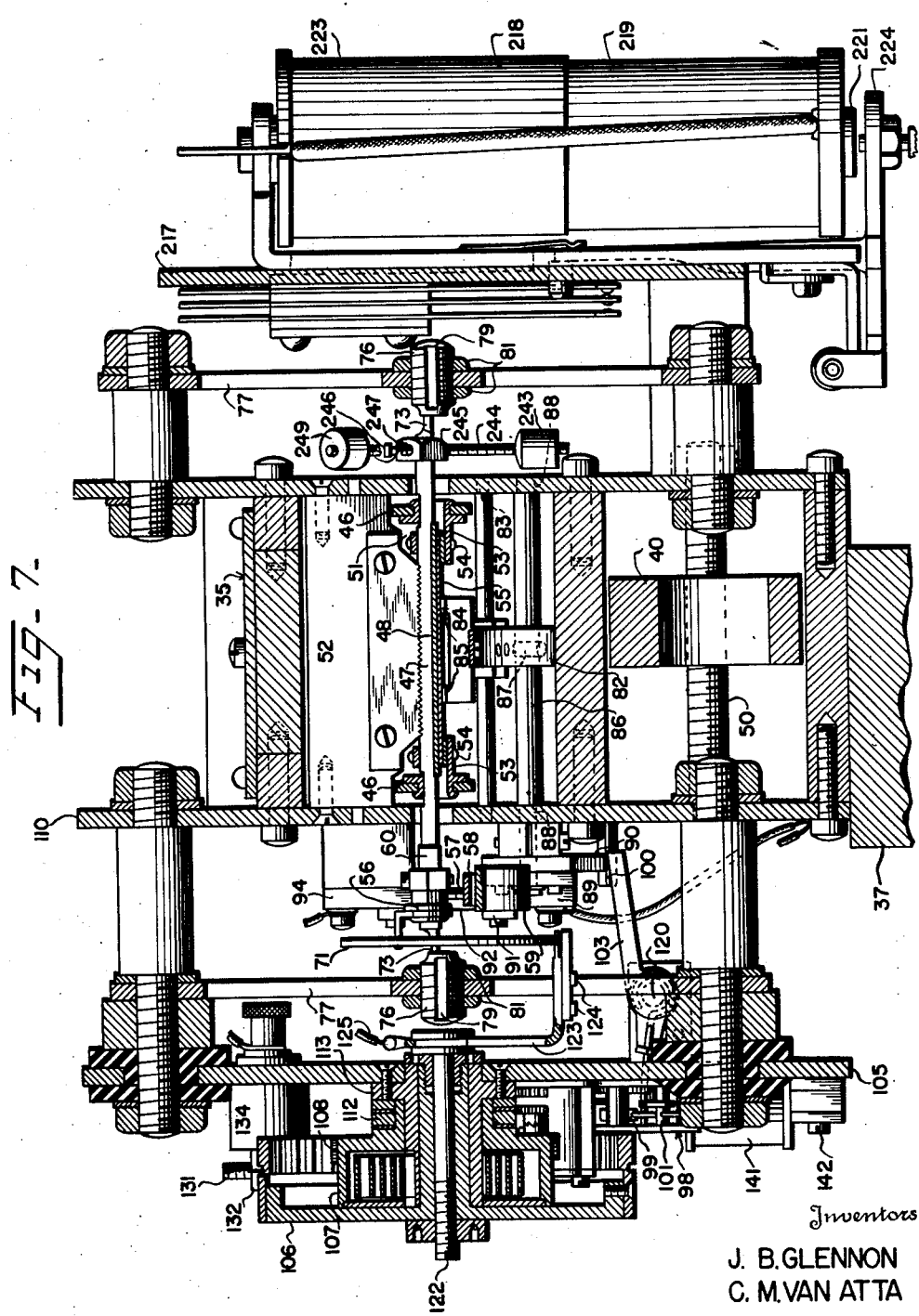
Inventors
J. B. GLENNON
C. M. VAN ATTA
By
Attorney

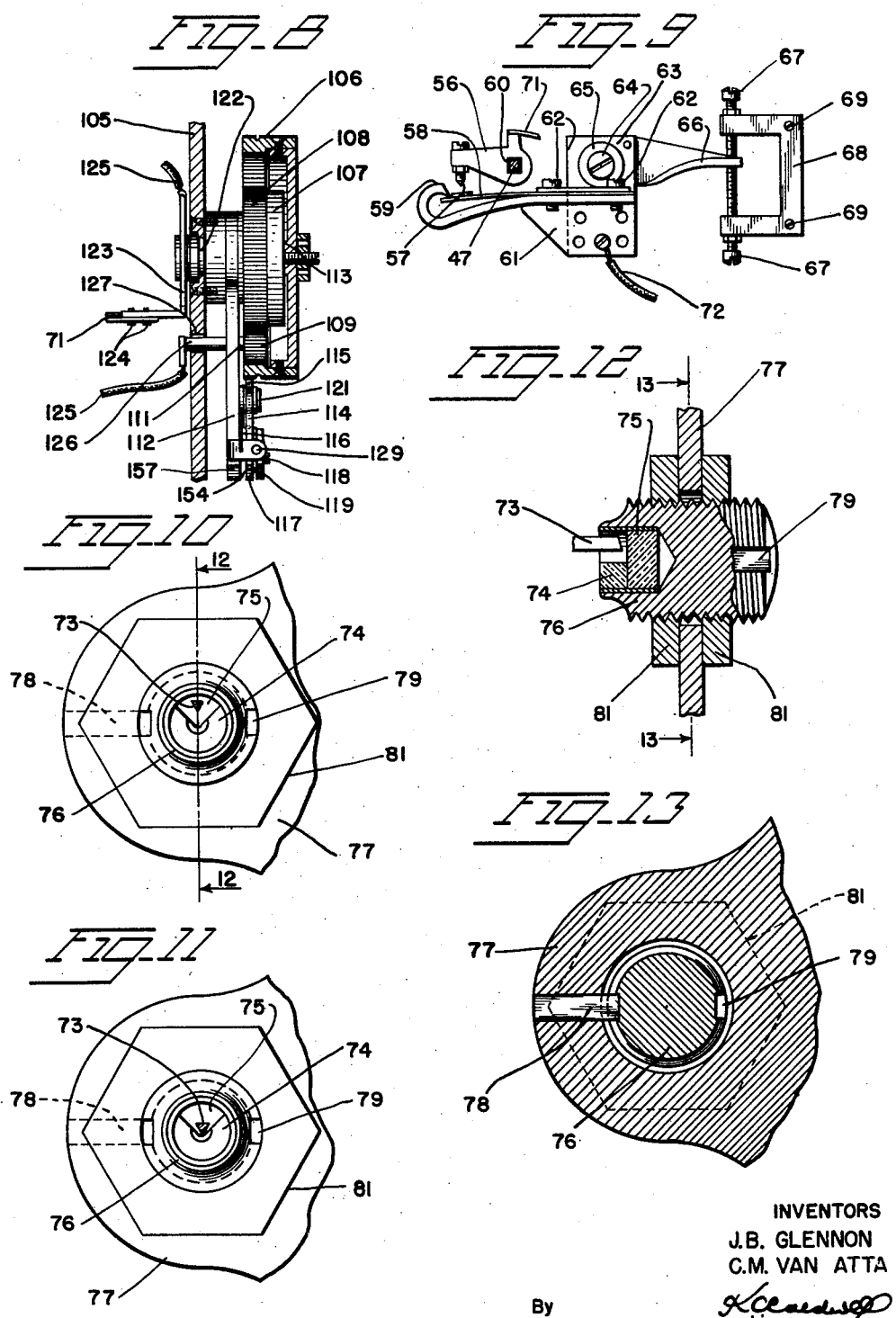

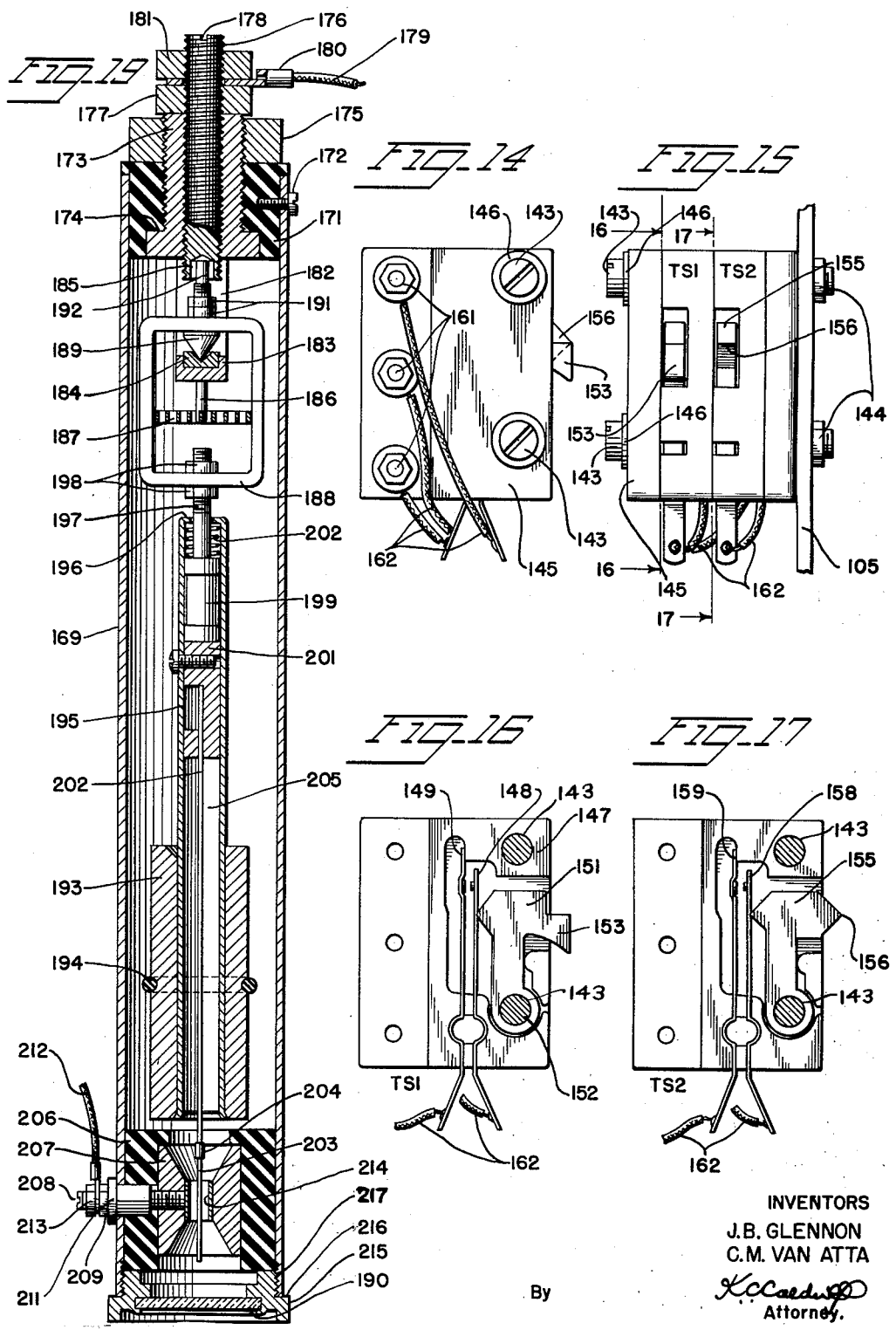

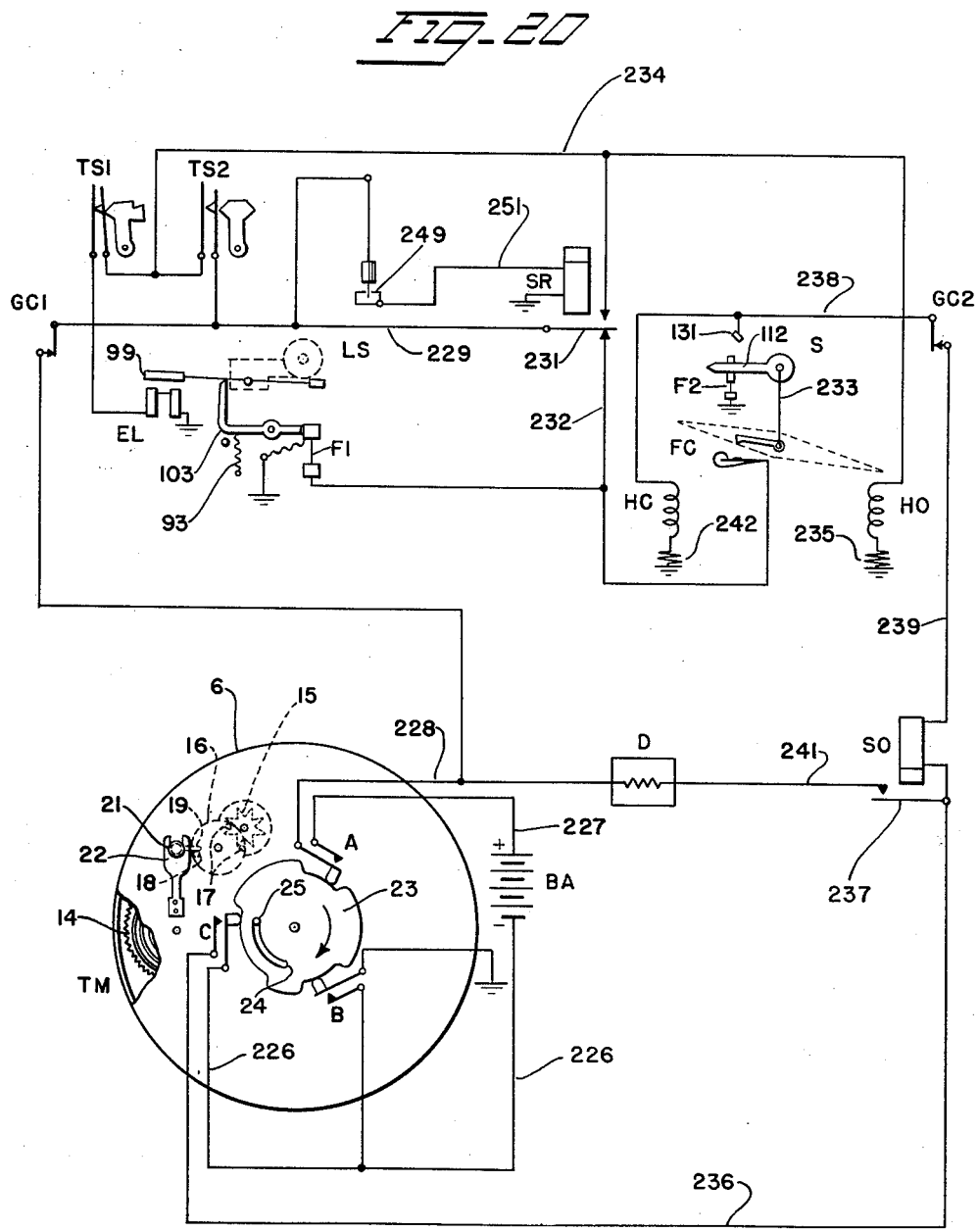

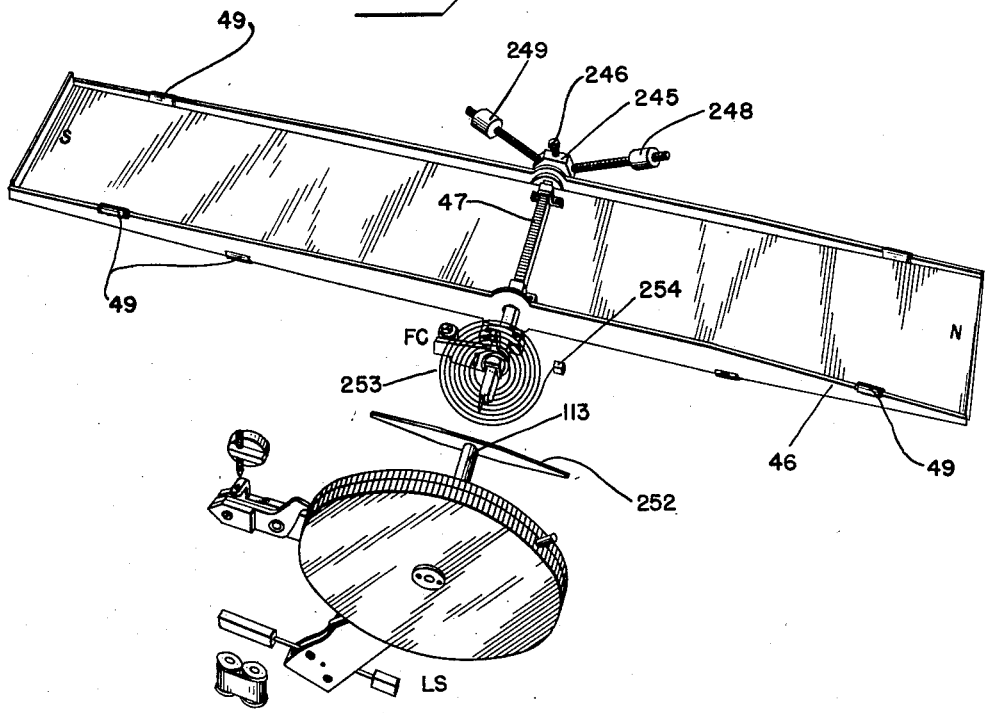
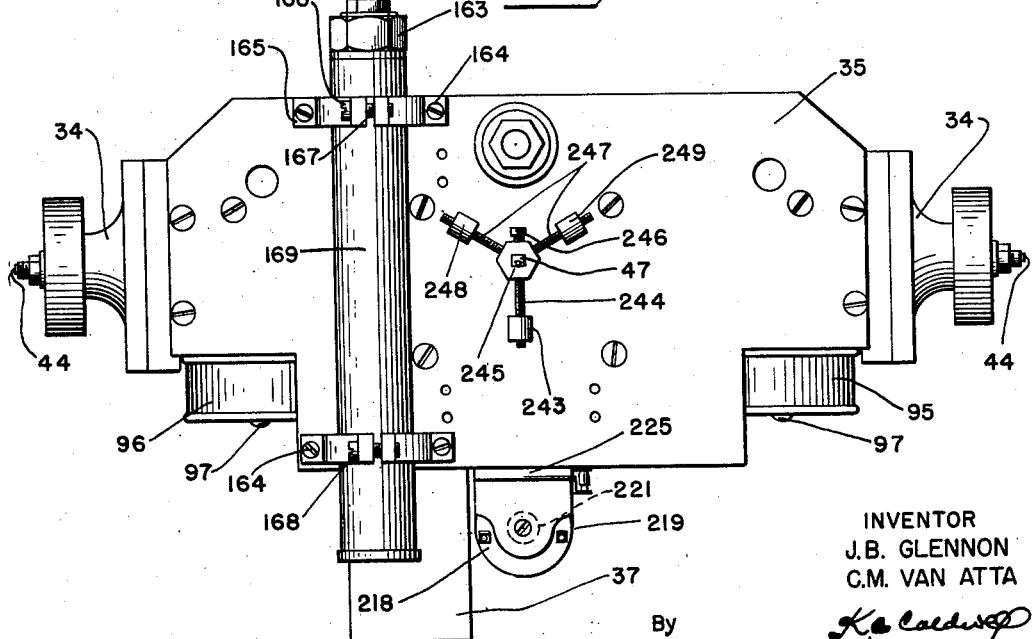

United States Patent Office 2,905,088
Patented Sept. 22, 1959

2,905,088

FIRING MECHANISM FOR A SUBMARINE MINE

James B. Glennon, Washington, D.C., and
Chester M. Van Atta, Bethesda, Md.

Application May 26, 1941, Serial No. 395,230

21 Claims. (Cl. 102—18)

(Granted under Title 35, U.S. Code (1952), sec. 266)

This invention relates to improvements in firing mechanisms for submarine mines and the like, wherein a magnetic needle or magnetized bar or other magnetized element is moved under or by the magnetic attraction or influence of a mass of steel, such as that contained in the structure of a vessel approaching or passing the mine, which movement, by establishing an electric circuit, is utilized to explode the mine. More specifically the magnetized element is automatically set to a predetermined sensitivity when the mine is launched whereby a change in the earth's magnetic field adjacent the mine such, for example, as that caused by the presence of a steel vessel within the vicinity of the mine, would move the magnetized element into a firing position thereby establishing a circuit from a source of electric current to an electro-responsive detonating device to operate the device and explode the mine.

It may be stated that the lines of force comprising the earth's magnetic field are perpendicular to the surface of the earth at the north and south magnetic poles, parallel to the surface of the earth at the magnetic equator and at an angle with the earth's surface at locations intermediate the equator and the poles depending upon the latitude of the location. If a balanced magnetic needle be pivoted for rotation in a vertical plane, the needle will assume a position as determined by the direction of the lines of magnetic force adjacent the needle at an angle to the surface of the earth depending upon the latitude in which the needle is placed, this angle being hereinafter referred to as the angle of inclination or dip of the needle.

It has ben found that within the vicinity of a steel ship or vessel the lines of force of the earth's magnetic field are so distorted that the intensity of the earth's magnetic field is altered. If such a ship passes over a submarine mine having a magnetic dip needle therein, the angle of dip of the needle would vary in accordance with the degree of distortion of the earth's magnetic field in accordance with the position of the ship or vessel relative to the mine.

In the system of the present invention the magnetic needle or element is provided with a biasing spring actuated by a clockwork mechanism to set the needle yieldably to an armed position at a relatively small angle with the horizontal whereby the needle would be moved to the horizontal, or firing position by a predetermined change in the magnetic field adjacent the element produced by the influence of a foreign or external mass of steel, this setting being referred to herein as the sensitivity or sensitivity setting of the element.

One of the objects of the present invention is to provide a new and improved magnetic influence mine firing device of simple and rugged construction which will be economical to manufacture and possess the desired qualities of reliability and efficiency in use and operation.

Another object is to provide a mine firing device of the above general character having new and improved means for arming the mine at a predetermined time after the mine has been launched.

Another object is the provision of new and improved means for setting the magnetic element to a predetermined sensitivity.

A further object resides in the provision of new and improved means for preventing the firing mechanism from receiving a violent jar as the mine is launched.

A further object is the provision of new and improved means for preventing detonation of the mine by countermining.

A further object is the provision of means for preventing the detonation of the mine due to a momentary closure of the firing contacts with the mine in an armed condition.

A still further object resides in the provision of an arrangement of parts including relay structure having an operating electromagnet with a ferromagnetic core whereby the presence of such parts does not materially affect the degree of response of the magnetic element to changes in the magnetic field adjacent the mine.

Further objects and advantages will be apparent from the following detailed description, taken in connection with the accompanying drawings, of which:

Fig. 1 shows a mine in accordance with one embodiment of the invention;

Fig. 2 is a view in section, partly broken away, of the mine of Fig. 1;

Fig. 3 is a view in perspective, partly broken away of the latitude setting and mine firing device of Fig. 1 with the cover removed;

Fig. 4 is a plan view, partly broken away, of the device of Fig. 3;

Fig. 6 is a view in elevation of the magnetic element and certain supporting and control elements thereof;

Fig. 6a is a greatly enlarged view in elevation partly broken away of the firing control mechanism showing, among other elements, the latitude setting device employed for controlling the sensitivity adjustment of the magnetic element;

Fig. 7 is a sectional view, greatly enlarged, taken along the line 7—7 of Fig. 6a;

Fig. 8 is a view, partly in section, of the drum of the latitude setting mechanism and certain control elements associated therewith;

Fig. 9 illustrates an arrangement of the firing contacts suitable for use with the system herein disclosed;

Fig. 10 is a view of the pivot support for the magnetic element with the magnetic element in locked position prior to launching of the mine;

Fig. 11 is a view of the pivot support of Fig. 10 with the magnetic element in a released condition;

Fig. 12 is a view, partly in section, taken along the line 12—12 of Fig. 10;

Fig. 13 is a view taken along the line 13—13 of Fig. 12;

Fig. 14 is a view in elevation of the trip switch arrangement of Fig. 3;

Fig. 15 is an end view of the device of Fig. 14;

Fig. 16 is a view taken along the line 16—16 of Fig. 15;

Fig. 17 is a view taken along the line 17—17 of Fig. 15;

Fig. 18 is a rear view of the device of Fig. 6;

Fig. 19 shows a view, partly in section, of the pendulum device of Figs. 3, 6 and 18;

Fig. 20 illustrates diagrammatically the electrical circuit arrangement of the entire system;

Fig. 21 illustrates a modification of the latitude setting mechanism suitable for use with the system of Fig. 20; and Fig. 22 shows an alternative form of the device.

Figure 5:
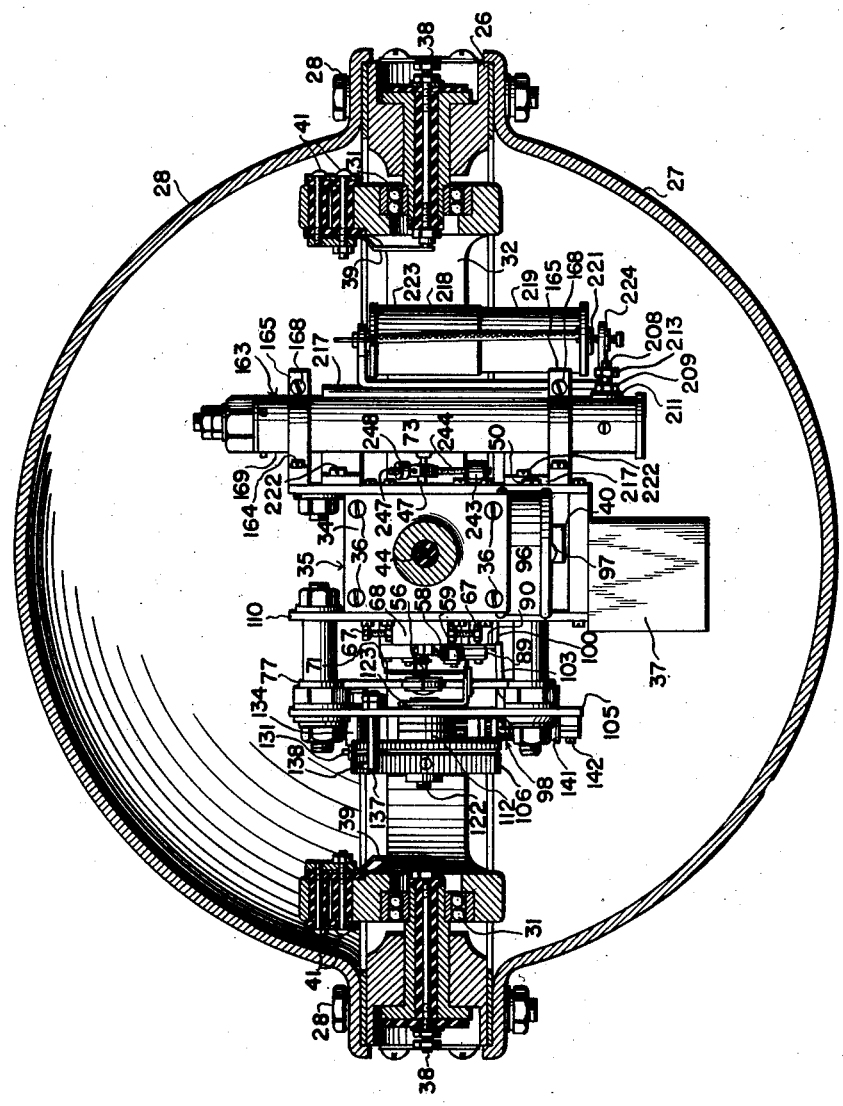
Fig. 5 is a view taken along the line 5—5 of Fig. 4.

Referring now to the drawings on which like numerals of reference are employed to designate like parts throughout the several views, there is shown on Figs. 1 and 2 thereof a complete mine according to a preferred embodiment of the invention, the mine comprising a casing designated generally by the numeral 1 having apertures 2 and 3 therein for admitting water pressure to an extender hydrostat and clock hydrostat secured in sealed relation thereto respectively. When the mine has attained a predetermined depth of submersion within a body of water, the extender hydrostat operates to place the detonator 4 within the body of the explosive charge 5 and the clock hydrostat operates to set the clock mechanism 6 in operation, as will be more clearly apparent as the description proceeds.

The clock 6 is enclosed within a casing 7 having suitable means for supporting a battery 8. The mine firing mechanism indicated generally by the numeral 9 is enclosed within a yieldable pad or cushion 11 of resilient material suitable for the purpose such, for example, as rubber, felt or the like, preferably formed in two parts or having a separation or slit therein whereby the mine firing mechanism may be inserted within the pad and thereby prevented from receiving a violent shock or jar as the mine is launched. A time delay relay 12 is yieldably secured to the casing of the mine in substantially the position indicated for preventing accidental detonation of the mine due to momentary closure of the firing contacts of the mine firing mechanism. An electric cable 13 having conductors therein is provided for establishing the circuit connections between the clock, the mine firing mechanism, the time delay relay and detonator aforesaid.

The mine may be launched from a submarine, a surface vessel or from an aircraft in flight. In the event that the mine is launched from an aircraft, a releasable parachute is preferably provided for lessening the force of impact of the mine against the water. After the mine has come to rest in a predetermined location on the bed of a body of water the parachute is detached therefrom by any means suitable for the purpose such, for example, as a soluble plug 10, Fig. 2.

The clock 6 is provided with one or more spring motors 14, Fig. 20, preferably of non-magnetic material suitable for the purpose such as Phosphor bronze, beryllium copper or the like, connected to a gear train having an escapement wheel 15 and escapement disc 16 provided with a pair of pins 17 adapted to engage the escapement wheel as the mechanism operates. A stop pin 18 is brought into engagement with the arm 19 secured to the plunger 21 as the plunger is held in the operated position by the clock hydrostat prior to the launching of the mine. When the water hydrostat operates, the arm 19 is moved out of engagement with the stop pin 18 by the spring 22, thereby setting the clock in operation and causing the cam member 23 to be moved until arrested by the end of the slot 24 within the cam 23 moving into engagement with the pin 25. The movement of cam 23 causes cam contacts A and B to be closed at a predetermined time, for example 20 minutes after the clock hydrostat has operated, and the cam contacts C to be closed at the expiration of a subsequent interval of time such, for example, as 25 minutes after the A and B cam contacts close. Cam contacts A, B, and C are prevented from reopening by the cam being brought to rest as the pin 25 engages the end of the slot 24.

Referring now to Figs. 3 and 4 of the drawings there is shown thereon an annular member 26 having a substantially hemispherical cover 27 detachably secured thereto as by the bolts 28, a front hemispherical cover 29 being provided to enclose and hermetically seal the mine firing mechanism when both covers are secured to the annular member preferably with a suitable gasket placed between each of the covers and the annular member to prevent leakage of air or moisture within the device. The annular member is provided with two bearing supports diametrically disposed thereon upon which is pivotally mounted, as by the ball bearings 31, the mounting ring 32. Located within the ring 32 are the ball bearings 33 into which are fitted the bearing supports 34 secured to the casing 35 as by the screws 36, the casing thus being suspended in gimbals and maintained in a leveled position by reason of the counterweight 37 secured to the lower side thereof and a second counterweight 40 supported by the threaded studs 50 journaled within the sides of the casing. Each of the studs 50 is provided preferably with a slot adapted to receive a tool whereby the studs may be rotated sufficiently to adjust the counterweight 40 to any desired position, the adjusted position being maintained by nuts threaded thereon and adapted to clamp the studs to the casing.

Coincident with the axis of the ball bearings 31, are the insulated pins 38 having a rounded or pointed end for making electrical connection with the contact springs 39 secured to the annular member 32 as by the screws 41 and insulated therefrom in any suitable manner such, for example, as shown on the drawing. A second pair of insulated contact springs 42 are in electrical connection with the springs 39 by the conductors 43 and adapted to engage the insulated pins 44 at the rounded or pointed ends thereof whereby no appreciable resistance to the free movement of the gimbals is introduced by the engagement of the springs 39 and 42 with their respective contact pins. The bearing supports 34 are each provided with an aperture within which is disposed a conductor 45 connecting the mine firing and latitude setting mechanism to the insulated pins 44, thus providing an arrangement whereby two circuits are brought through the gimbal bearing supports to the mine firing and latitude setting control mechanism, indicated generally at GC1 and GC2, Fig. 20, the common or ground return circuit being established through the ball bearings by way of a conductor within the cable 13 in electrical circuit with the annular member 26.

The magnetic needle or element, Figs. 6 and 7, comprises two parallel magnetized steel bars 46 preferably tapered from the center toward the ends and having a hole in the center thereof through which a shaft 47 is adapted to pass. An aluminum or other light non-magnetic metal strip 48 is provided with projecting portions or tabs 49 adapted to engage complementary portions of the magnetic bars 46 and maintain the bars in locked engagement with each other and additionally serve as an air baffle to prevent sudden movement of the magnetic element within the air chamber 51. The supports 34 have their inner ends curved to impede the flow of air past the ends of the baffle plate or strip 48 as the magnetic element is rotated within the air chamber and a partition or baffle 52 secured preferably to the air chamber impedes the flow of air from one end of the upper part of the air chamber to the other end thereof.

The bushing members 53 are spun or otherwise secured to the magnetic bars 46 and clamped to the shaft 47 by the rivets 54 and clamping plate 55. The shaft 47 is provided with an insulating bushing 60, Figs. 7 and 9, upon which is mounted the contact arm 56 having an adjustable firing contact 57 thereon adapted to engage the contact spring 58 as the magnetic element moves into the firing position. The contact spring 58 is tensioned against the back stop 59 and secured thereto and to the mounting detail 61 as by the screws 62, the mounting detail being riveted or otherwise attached to an insulating member 63 pivotally mounted on the air chamber housing as by the screw 64 and washer 65, an arm 66 secured to the insulating member being provided to coact with the screws 67 in adjusting the setting of the firing position of the magnetic element. The screws 67 are in threaded engagement with a support 68 secured to the air chamber as by the screws 69.

The firing contact arm 56 has connected thereto a biasing spring 71 for yieldably setting the magnetic element to a predetermined sensitivity by the latitude setting mechanism and for establishing a circuit connection to the firing contact 57. This contact spring 58 is in electrical connection with the conductor 72 attached preferably to the member 61 for establishing a circuit connection to the contact spring.

The shaft 47, Fig. 7, is formed to a V-shaped knife edge 73 at the ends thereof for engagement with V-shaped jewel bearings 74, Fig. 10, set within the threaded bearing screw 76, slideably mounted within the mounting plates 77 affixed to the sides of the air chamber. A pin 78 passes through the plate 77 and engages a slot 79 in the bearing screw to prevent rotation thereof as the screw is adjustably clamped in position against the mounting plate 77 by the nuts 81 threaded on the screw.

A rotatable member 82 pivoted to the air chamber at 83 is provided with a block 84 having a serrated surface 85 thereon adapted to engage a complementary serrated flat surface on a plate secured to the lower side of the shaft 47 and raise the shaft 47 and rotate the magnetic element to an initial or unarmed position whereby the knife edges 73 are disengaged from their jewel bearings until after the mine has been launched. A shaft 86 having an arm 87 thereon adapted to engage the member 82, is pivoted at 88 to the sides of the air chamber and provided with a lever arm 89, Fig. 3, having a clamp 91 at one end thereof adapted to hold the fuse element 92, hereinafter referred to as F1, and thus maintain the shaft 86 in an operated position and the magnetic element in an unarmed position with the knife edge supports clear of their bearings until fuse 92 is operated in response to the operation of the clock hydrostat, as will more clearly appear as the description proceeds. The arm 89 is also provided with a projecting portion 90 adapted to be arrested by a back-stop 100 secured to the plate 110, Figs. 6a and 7. The member 82 is moved by the spring 93 to the position shown on Fig. 6 thereby lowering the shaft 47 and allowing the magnetic element to be rotated about its jeweled bearing supports. The other end of the fuse element 92 is attached to the fuse block 94.

Two air core coils 95 and 96 are mounted beneath the air chamber in any suitable manner as by the screws 97, each of the coils being preferably provided with two windings for maintaining the magnetic element in the firing position in response to the closure of the firing contacts, or maintaining the magnetic element in an unarmed position, as the case may be. For this purpose one winding of each of the coils is connected in series with a winding of the other coil in such a manner that one winding of each of the coils is simultaneously energized to set up a magnetic field of a predetermined polarity about the magnetic element to produce the desired result. It will be understood that, if desired, each coil may comprise a single winding, in which case one coil would be employed for maintaining the magnetic element in the firing position and the other coil for moving the magnetic element to the unarmed position.

The latitude setting device comprises a gear train 98, Fig. 3, having an escapement mechanism with an oscillating metallic member 99 pivoted at 101 and provided with a counterweight 102, the member 99 being restrained from movement by the pivoted arm 103 which is moved out of engagement with the member 99 by the lever arm 89 as the fuse member 92 is operated. A slot 104 is provided within the plate 105 to provide for movement of the arm 103 about the pivot 120, Fig. 7. Within the drum 106 is disposed a spring barrel 107 having a gear 108 thereon adapted to engage the gear train 98 and the gear 109, pivotally mounted at 111 on the rotatable arm 112. The drum 106, gear 108, and arm 112 are pivotally mounted upon the stud 113 rigidly attached to the plate 105 to which is secured one end of a beryllium copper, or Phosphor bronze spring, the other end of the spring being connected to the spring barrel 107 by means of which the gear train is operated and the arm 112 moved to its latitude or sensitivity setting. A pawl 114 having an arm 115 thereon is urged by a spring 116 into locking engagement with the drum 106 but restrained therefrom by a fuse member 117, hereinafter referred to as F2, secured thereto as by the screw 118 and clamping member 119, the pawl being pivotally attached to the arm 112 by the stud 121.

The drum 106 is provided with a serrated or knurled surface about the outer periphery adapted to engage and lock the drum to the pawl 114 as the fuse member 117 operates, and an internal gear adapted to engage the teeth of the gear 109. The drum 106 is connected by a shaft 122 to the arm 123 which takes a setting in accordance with the setting of the drum 106 thereby yieldably setting the magnetic element by means of the spring 71 connected to the arm, as by the screws 124. A flexible conductor 125 is attached to the arm 123 whereby an electric circuit from the conductor is continued by way of the spring 71 to the firing contact 57, Fig. 9. The arm 112 is provided with a stud or terminal 126 passing through an aperture 127 within the plate 105 and connected to the flexible conductor 125 in electrical circuit with the contact 129 on the arm 112 adapted to engage the adjustable contact screw 131 to arrest the movement of the arm 112 and bring the latitude setting device to rest thereby arming the mine. The contact screw 131 is clamped by a stud 132 passing through an arcuate slot 133 within the plate 105 and insulated therefrom by the spacing member 134 which may be of any material suitable for the purpose such, for example, as hard rubber, Bakelite, fiber or the like. A suitable nut and washer are provided at the rear of the plate 105 for clamping the stud 132 in any desired position and for securing the connection of an electrical conductor thereto, in any well known manner. A series of scale divisions or markings 135 are provided on the plate 105 in proximate relation to the indicating mark 136 on the bushing or spacing member 134 whereby the stud 132 and screw 131 may readily be set to a position in accordance with a predetermined sensitivity. The plate 105 is electrically insulated from the air chamber and annular ring member by suitable insulating washers and bushings generally in the manner indicated on Figs. 3 and 7 of the drawings. Plate 105, it will be noted, is also provided with a pin 137 projecting therefrom and adapted to engage the pins 138 and 139 of the drum 106 and thereby limit the degree of rotation of the drum and the spring barrel 107.

A pair of electromagnets 141 are mounted on the plate 105 as by the screws 142 in proximate relation to the member 99 and adapted to attract the member 99 thereto and arrest the operation of the latitude setting mechanism during the time the electromagnets are energized. For convenience in describing the operation of the system of the present invention, the electro-magnets 141 are hereinafter identified by the designation EL.

Secured to the plate 105 as by the screws 143 and nuts 144 are the trip switches TS1 and TS2, Fig. 15, a plate or cover 145 being provided to enclose and protect the mechanism of switch TS1. Washers 146 are preferably provided between the screws 143 and cover 145 to hold the switch assemblies securely in position against the plate 105. Referring now to Fig. 16 on which is shown a view of the mechanism of the switch TS1 with the cover 145 removed, a casing 147 of suitable insulating material such, for example, as moulded Bakelite, hard rubber or the like, is provided with a recessed portion therein within which are disposed the contact springs 148 and 149 adapted to engage each other as the switch rocker arm 151 operates. The rocker is pivoted at 152 and provided with a projection 153 adapted to be engaged by the end 154 of the pawl 114, Fig. 3, during the time the pawl is held in locked position by the fuse element 117. As the fuse 117 operates the end 154 of the pawl is moved out of engagement with the projection 153 by the spring 116, Figs. 6a and 8, thereby causing the contact spring 148 to move out of engagement with spring 149 and thus interrupt the circuit to the electro-magnetic lock EL, Fig. 20.

The switch TS2 is similar in construction generally to the switch TS1, the switch TS2 comprising a rocker arm 155 having a projecting portion 156 thereon adapted to be operated by the end 157 of the arm 112, Figs. 6a and 8, during movement of the arm to its latitude setting position. The operation of the rocker arm causes the contact springs 158 and 159 to close and momentarily energize the hold off coil HO, Fig. 20. Three terminals 161 are provided for establishing the electrical circuit connections to the trip switches, the circuits being extended from the terminals 161 to the contact springs 148, 149, 158 and 159 by suitable conductors 162.

Referring now to Fig. 18 of the drawings there is shown thereon a pendulum indicated generally by the numerals 163 secured to the air chamber as by the screws 164, two mounting brackets 165 being provided for this purpose. Each of the mounting brackets is slotted as at 167 thus providing an arrangement whereby the pendulum is clamped securely in a vertical position by means of the clamping screws 168. The pendulum comprises a cylindrical tube or casing 169 of non-magnetic material such, for example, as brass having fitted within the upper end thereof an insulating bushing 171, Fig. 19, securely held to the tube in any suitable manner, as by the screws 172 and provided with a threaded hole therein adapted to receive and securely support the metal insert 173, a shoulder 174 preferably being formed on the insert to coact with a complementary recess within the bushing when the parts are in an assembled condition. The insert is provided with a nut 175 to maintain the shoulder locked against the recess.

The insert has a tapped hole therein adapted to receive a screw 176 which is locked in an adjusted position by means of the nut 177, movement of the screw for adjusting the same being provided by any suitable means such as the slot 178 in the upper end thereof adapted to receive a suitable adjusting tool. An electrical connection with the screw 176 is established by means of a conductor 179 having a terminal 180 thereon clamped to the screw as by the nut 181. The insert 173 includes a metal L-shaped member 182 having a lateral portion 183 with a pivot bearing 184 thereon in coincidence with the axis of the screw 176 and in alignment with a hole 185 within the lower end of the screw. The member 182 is also provided with a post 186 to which is secured in any well known manner one end of a hairspring 187, the other end of the hairspring being secured to an apertured support 188 thereby to maintain a continuous electrical connection between the support and the conductor 179. A pivot 189 is secured to the support as by the nuts 191 and provided with a small post 192 adapted to fit loosely within the hole 185 of the screw and prevent the pivot from being dislodged from the pivot bearing 184 as the pendulum is suddenly jarred or tilted. The pivot and pivot bearing are formed from any suitable material or composition such, for example, as an alloy of gold and platinum of the proportions of 90 and 10 percent respectively.

The pendulum bob 193 is provided with an annular groove or slot adapted to receive a ring 194 of any suitable insulating material such as fiber or the like whereby the bob is prevented from striking against the inner side of the tube 169, the bob also including a hollow support or tube 195 with a shoulder 196 at the upper end thereof within which the shaft 197 is adapted to move freely. The shaft 197 is secured to the support 188 by means suitable for the purpose, such as the nuts 198, a slot or hole being provided within the support to receive the shaft. The lower end of the shaft 197 terminates in a piston or plunger 199 adapted to slide freely within the tube 195 but normally held against the plug member 201 by the spring 202 which is of sufficient size and tension to permit movement of the pendulum bob relative to the shaft 197 and thus protect the pivot support from injury as the mine is laid.

The plug member 201 is provided with a flexible narrow rod or wire 202 affixed thereto having a length of precious metal contact wire or rod 203 attached to the lower end thereof as by the clamp or coupling 204, an aperture 205 being provided within the pendulum bob to enable the contact 203 to move relative to the pendulum bob.

An insulating bushing 206 having a metal insert 207 therein is fitted within the lower end of the tube or casing 169 and secured thereto as by the rod 208 threaded into the metal insert 207 and clamped to the tube as by the nut 209 and insulated therefrom as by the washer 211 inserted between the nut and the outside of the casing. An electrical connection with the insert 207 is maintained continuously by the conductor 212 and nut 213.

The insert 207 is provided with an aperture within which is fitted the annular contact member 214 of precious metal or metal alloy suitable for the purpose such, for example, as an alloy having 90 percent gold and 10 percent platinum. The contact 203 is preferably of the same material as the contact member 214 although it will be understood that, if desired, the contact 203 may be composed of material different from the material of the contact member 214.

With the pendulum in a vertical position the contact 203 is substantially concentric with and electrically disconnected from the contact member 214 whereas as the pendulum is moved from a vertical position, the pendulum bob causes the contact 203 to be brought into engagement with the contact member thereby closing a circuit between conductors 179 and 212 and causing the mine to be disarmed as will more clearly appear as the description proceeds. A cap 215 having a shoulder 216 thereon adapted to engage the lower end of the casing 169 is provided with a threaded portion 217 for engaging a complementary threaded portion of the casing or tube 169 and securing the cap thereto, although it will be understood that the cap may be secured to the tube in diverse ways such, for example, as by means of screws or by threading the cap on an exterior portion of the tube. The cap is provided preferably with a central aperture enclosed by a sheet 190 of transparent material such as clear glass or Lucite thus providing an arrangement whereby the contacts may be inspected with the tube in a sealed condition and dirt and moisture are permanently excluded from the interior of the pendulum casing.

Secured to the rear of the air chamber in any suitable manner as by the support 217, is a relay 218 having an electromagnet 219 with a core 221 of ferromagnetic material such for example, as iron, the support 217 being held in rigid engagement with the air chamber by the screws 222 such that the axis of the ferromagnet is substantially vertical and intersects the axis of rotation of the shaft 47. A sleeve of copper 223 encircles and is supported by the core 221 thereby to make the relay slow in releasing. The relay is also provided with an armature 224 adapted to open a pair of normally closed contacts and close a pair of normally open contacts as the relay operates. The winding of the relay is connected to the pendulum whereby the closure of the pendulum contacts causes the relay to operate, the release of the relay occurring in time delayed relationship with respect to the opening of the pendulum contacts by reason of the slow releasing characteristic of the relay. The distortion of the vertical component of the earth's magnetic field due to the presence of the core 221 is symmetrical with respect to a vertical plane passing through the axis of the shaft 47 and for this reason the arrangement disclosed enables the relay to be disposed adjacent the magnetic dip needle. Furthermore, the external field set up by the relay is preferably of such polarity as would cause the magnetic needle to be moved toward the unarmed position.

Fig. 22 of the drawings shows an alternative form of the device wherein the relay 218 is mounted by the support 225 directly below the shaft 47 of the magnetic needle and with the ferromagnetic core 221 of the electromagnet 219 parallel to the axis of the shaft. With this arrangement the magnetic needle is symmetrically disposed with respect to the field set up by the relay and adapted to be moved selectively to different settings in accordance with changes in the magnetic field adjacent the needle. It will, of course, be understood that, if desired, the relay may be mounted directly above the shaft 47 with the ferromagnetic core 221 thereof parallel to the shaft, the counterweight 37 being of sufficient mass to maintain the casing 35 in a leveled position regardless of the position of the mine.

The operation of the system will now be described. First let it be assumed, by way of example, that the fuse elements F1 and F2, Fig. 20, have been placed in position, the spring motors of the clock timing mechanism TM and the latitude setting mechanism LS have been wound, the detonator D is connected, an explosive charge has been placed within the mine and the mine has been sealed and launched from an aircraft in flight. Upon striking the water the mine sinks and comes to rest on the bed of the body of water and the parachute is released by means suitable for the purpose such, for example, as by a soluble plug. When the mine has descended to a predetermined depth beneath the surface of the water, the pressure of the water causes the extender and clock hydrostats to operate, the extender hydrostat placing the detonator D in operative position with respect to the explosive charge and the clock hydrostat causing movement of the plunger 21, Fig. 20, thereby withdrawing the arm 19 out of engagement with the stop pin 18 and thus setting the clock timing mechanism TM in operation. Whereas in the illustrative embodiment of the invention shown on the drawings two hydrostats are employed, it will be understood that, if desired, a single hydrostat may be provided for extending the detonator and setting the clock timing mechanism in operation.

Approximately twenty minutes after the clock TM has been started, the cam contacts A and B are closed by the cam 23 thereby closing a circuit from ground at cam contacts B by way of conductor 226 to the negative pole of the battery BA from whence the circuit is continued from the positive pole of battery BA, conductor 227, contacts of cam A, conductor 228, contacts GC1 of the gimbals, conductor 229, armature 231 and break contact of relay SR, conductor 232, fuse element F1 and thence to ground, thereby causing the fuse F1 to operate and interrupt the circuit just described. The operation of fuse F1 also causes the shaft 86, Fig. 6, to rotate by the action of the spring 93 thereby unlocking the needle comprising the magnetic bars 46 and pivoting the needle for rotation upon its jeweled supports. The rotation of shaft 86 causes the arm 103 to be moved out of engagement with the member 99 thereby allowing the member 99 to oscillate and set the latitude setting mechanism into operation. As heretofore stated, the latitude setting mechanism is flexibly connected to the magnetic needle element by suitable means such, for example as the hair spring 71, Figs. 7, 8 and 9, and the operation of the latitude setting mechanism at this time, therefore, causes the magnetic element to be moved to a setting such that the firing contacts FC thereof are closed. When this occurs, a circuit is completed from ground at cam contacts B, conductor 226, battery BA, conductor 227, cam contacts A, conductor 228, contacts GC1, conductor 229, armature 231 and break contact of relay SR, conductor 232, contacts FC, conductor 233, latitude setting arm 112, fuse element F2 and thence to ground thereby causing fuse F2 to operate and interrupt the circuit just described. The operation of fuse F2 also causes the pawl 114, Figs. 6a and 8 to be urged by the spring 116 into locking engagement with the drum 106 whereby the drum and gear 109 are locked to the arm 112 and thus the movement of the drum 106 is reversed, the drum 106 and latitude setting arm now moving together as a unit in a direction to cause the firing contacts to be disengaged.

As the pawl 144 is released by the operation of the fuse F2, the contacts of the trip switch TS1 are opened thereby interrupting the circuit to the magnet EL. During the first part of the movement of the latitude setting arm from its locked position, the contacts of the trip switch TS2 were momentarily closed thereby applying battery on conductor 229 by way of the contacts of trip switch TS2, conductor 234 and thence to the winding of the hold off coil HO, the circuit continuing through a resistance 235 to ground. The energization of coil HO causes the magnetic element to be moved away from the contact closing or firing position thereby positively to disengage the contacts FC during the movement of the latitude setting arm 112 to the armed or sensitivity setting thereof. The latitude setting arm continues to rotate until the arm is arrested by moving into engagement with the adjustable contact 131 thereby causing the latitude setting mechanism to be brought to rest with the magnetic element set to a position such that the firing contacts FC will be closed by a predetermined degree of change in the earth's magnetic field adjacent the element.

At a predetermined period of time such, for example, as 25 minutes after cam contacts A and B close, the cam contacts C are closed by the clock timing mechanism, thereby applying ground at cam contacts B by way of conductor 226, cam C contacts, conductor 236 and thence to armature 237 and one end of the winding of the slow operating time delay relay SO. The mine is now in an armed condition. When the end 24 of the slot engages the stop pin 25, the clock timing mechanism TM is brought to rest with cam contacts A, B and C thereof held closed by the cam 23.

When a change occurs in the magnetic field adjacent the magnetic element sufficient to cause the firing contacts FC to be moved into closed position, a circuit is closed from the positive terminal of battery BA, conductor 227, cam contacts A, conductor 228, contacts GC1, conductor 229, armature 231 and break contact of relay SR, conductor 232, firing contacts FC, conductor 233, latitude setting arm 112, contact 131, conductor 238, contacts GC2, conductor 239, winding of relay SO, conductor 236, cam contacts C, conductor 226 and thence to the negative terminal of battery BA thereby causing current to flow through the winding of relay SO. If the closure of the firing contacts FC is momentary such, for example, as closure caused by a mechanical disturbance of the mine, relay SO does not operate due to its slow operating characteristic and the mine is not detonated.

In the event that the firing contacts FC remain closed for a period of time sufficient to operate the relay SO due to the continued presence of a changed magnetic field adjacent the magnetic element, such, for example, as the change in the magnetic field caused by a steel vessel or other large mass of steel or iron moving within the vicinity of the mine, relay SO operates and closes a circuit from positive pole of battery BA, conductor 227, cam contacts A, conductor 228, through the detonator D, and thence by way of conductor 241, make contact and armature 237 of relay SO, conductor 236, cam contacts C and conductor 226 to negative pole of battery BA, thereby operating the detonator D and causing the mine to explode. Whereas to avoid unnecessary complication of the disclosure the time delay device SO has been illustrated as a slow operating relay, it will be understood that this is by way of illustration only, as electro-responsive delay devices with a delay mechanism comprising clock work, escapement wheels, dash pots or other delay means suitable for the purpose may be employed.

The operation of the firing contacts FC also closes a circuit from ground at cam contacts B, conductor 226, battery BA, conductor 227, cam contacts A, conductor 228, contacts GC1, conductor 229, armature 231 and break contact of relay SR, conductor 232, firing contacts FC, conductor 233, latitude setting arm 112, contact 131, conductor 238, winding of the hold on coil HC, resistance 242 and thence to ground thereby energizing the coil HC and maintaining the firing contacts in closed condition. It will be understood that a change in the magnetic field of relatively short duration such, for example, as that produced by certain mine sweeping operations, will cause the magnetic element to close the firing contacts ballistically and when this condition occurs, the contacts FC are opened by the rebound of the magnetic element and firing contact arm regardless of the energized condition of the coil HC. The magnetic element is thus prevented from locking in the firing position when short magnetic pulses are received thereby preventing the operation of the time delay device SO and rendering the mine immune to this type of mine sweeping operations.

The rate of response of the magnetic element to a change in the magnetic field adjacent the element is controlled by the adjustable weight 243, Fig. 22, preferably threaded on the downwardly projecting arm 244 secured to the shaft 47 in any suitable manner as by the hub 245, and clamping screw 246. Projecting upwardly and outwardly from the hub 245 are the arms 247 upon which are adjustably mounted the weights 248 and 249 whereby, by suitable adjustment of these weights, the center of gravity of the mass supported by the shaft 47 may be varied at will to insure that a predetermined direction of torque will invariably be applied to the shaft 47 by the coiled spring 71.

The operation of the pendulum P which occurs, it will be recalled, whenever the mine is suddenly moved or disturbed, as by countermining, closes a circuit from ground at cam contacts B, conductor 226, battery BA, conductor 227, cam contacts A, conductor 228, contacts GC1, conductor 229, pendulum contact 249, conductor 251, winding of relay SR and thence to ground thereby causing relay SR to operate. The operation of relay SR at the normally closed contacts thereof interrupts the circuit to the firing contacts FC thereby disarming the mine and as armature 231 of relay SR moves into the operated position a circuit is completed from ground at cam contacts B, conductor 226, battery BA, conductor 227, cam contacts A, conductor 228, contacts GC1, conductor 229, armature 231 and make contact of relay SR, conductor 234, winding of the hold off coil HO, resistance 235 and thence to ground, thereby energizing coil HO and thus positively preventing the movement of the magnetic element into the firing position. Also if switch TS1 has not been opened by the operation of fuse F2, when the pendulum operates, the electro-magnet EL operates in parallel with the hold off coil HO, thereby attracting the oscillating element 99 and arresting the latitude setting mechanism LS.

When the pendulum P is restored to a vertical position the circuit to the winding of slow releasing relay SR is interrupted at the pendulum contacts 249 and shortly thereafter relay SR releases. As armature 231 moves away from the operate position battery is removed from conductor 234 thereby deenergizing the hold off coil HO and the electro-magnet EL and thus causing the magnetic element to be released for rotation and the latitude setting operation to be resumed. By stopping the latitude setting mechanism simultaneously with the energization of the coil HO in the event that the pendulum contacts are operated during movement of the magnetic element from the initial locked position to the firing position, the degree of relaxation of the spring 71 necessary to bring the firing contacts FC into closed position to operate the fuse F2 is thus invariably controlled by the azimuth position of the magnetic element which, it will be recalled rotates in a vertical plane, and the latitude of the location within which the mine is laid. The tension of the spring 71 is gradually increased after the contacts FC have been closed until the latitude setting arm 112 has moved through a predetermined angle of rotation and been brought to rest by the adjustable contact screw 131. The magnetic element is thus given a predetermined sensitivity setting regardless of countermine operations that may occur during the operation of the setting mechanism.

Should the pendulum P operate after the latitude setting arm 112 has been released by the fuse F2, the operation of relay SR causes the hold off coil HO to operate but the latitude setting mechanism LS would not be arrested until the latitude or sensitivity setting operation is complete for the reason that the operate circuit to the electro-magnet EL is interrupted at the contacts of trip switch TS1.

Referring now to Fig. 21 of the drawings there is shown thereon a modification of the latitude setting mechanism LS of Fig. 8, whereby the spring 71 employed for flexibly connecting the shaft 47 to the shaft 113 of the latitude setting mechanism has been replaced by a magnetic coupling arrangement. Briefly stated, the arrangement of Fig. 21 comprises a permanent magnet 252 supported by and rotatable with the shaft 113 in proximate space relation to the pivoted magnetic needle 46, the north pole of the magnet 252 being substantially opposite the south pole of the magnetic needle and the south pole of the magnet 252 opposite the north pole of the needle. The magnetic force of attraction between the magnetic needle 46 and the permanent magnet 252 will cause the magnetic needle to follow the movement of the magnet 252 as the latitude setting mechanism operates whereby the magnetic element is given a sensitivity setting such as will cause the firing contacts FC to be closed by a predetermined degree of change in the magnetic field adjacent the magnetic element. A coiled spring 253 is preferably provided additionally to control and retard the movement of the magnetic element, the spring being operatively connected at the inner end thereof to the magnetic element as by a suitable collet secured to the shaft 47 or, if desired, in the manner of the spring 71, and attached at the outer end to the exterior of the air chamber, or the mounting plate 77, Fig. 3, as by the support 254 secured thereto.

Whereas, by way of illustration, a single magnet 252 has been shown affixed to the shaft 113, it will be understood that, if desired, two such magnets may be employed, the magnets being disposed preferably on opposite sides of the magnetic member 46 and actuated simultaneously in either direction by the shaft 113. The magnets may be mechanically coupled in any manner suitable for the purpose, as by providing a U-shaped extension for the shaft 113 or by employing a chain, linkage or gearing arrangement.

Briefly stated in summary, the present invention contemplates the provision of a new and improved magnetic mine adapted to be launched from a considerable height by an aircraft in flight or from a surface or under water craft, in which means are provided for arming the mine within a predetermined period of time after the mine is laid, for releasing from a locked position and automatically setting the magnetic element therein to a predetermined sensitivity setting, for preventing detonation of the mine from countermining or mine sweeping operations and for causing the mine to explode when the magnetic field adjacent the mine has been changed by the presence of a steel vessel or other mass of steel or iron within the vicinity of the mine.

While the invention has been described with reference to certain preferred examples thereof which give satisfactory results, it will be understood by those skilled in the art to which the invention pertains, after understanding the invention, that various changes and modifications may be made without departing from the spirit and scope of the invention, and it is our intention therefore to cover in the appended claims all such changes and modifications.

The invention herein described and claimed may be manufactured and used by or for the Government of the United States of America for governmental purposes without the payment of any royalties thereon or therefor.

What is claimed as new and desired to be secured by Letters Patent of the United States is:

1. In a magnetic mine adapted to be immersed within a body of water, timing mechanism comprising a plurality of means for closing a plurality of circuits at predetermined intervals of time, means controlled by the pressure of the water for setting said timing mechanism in operation to close said plurality of circuits in succession, a magnetic element movable to different settings in accordance with varying degrees of strength of the vertical component of the earth's magnetic field adjacent the magnetic element, means including a pivot for supporting said magnetic element, means for holding the magnetic element in locked disengagement from said pivot supporting means, a slow releasing relay having normally closed contacts adapted to be disengaged as the relay operates, a pendulum device having electrical contact means adapted to operate said slow releasing relay as the mine is suddenly displaced, means including a fusible retaining device controlled by one of said circuit closing means for disengaging the magnetic element from said holding means and bringing the element into operative engagement with the pivot supporting means, means including a resilient member operatively connected to the magnetic element and settable to different positions in accordance with a predetermined degree of bias to be applied to the magnetic element, means including gear mechanism released by the fusible retaining device for actuating said settable means, means including an adjustable contact for causing said settable means to take a setting corresponding to said predetermined degree of bias, firing contact means adapted to be closed by said magnetic element when the strength of the magnetic field adjacent the magnetic element has been increased by a predetermined amount, a slow releasing electro-responsive device operatively connected by said adjustable contact means to said firing contact means, means including another of said circuit controlling means and the normally closed contact of said slow releasing relay for rendering the slow acting device effective, a detonating device, and means controlled by said slow acting device for operating said detonating device in response to the closure of said firing contact means.

2. In a magnetic mine adapted to be immersed within a body of water, timing mechanism having a plurality of circuit closing elements operable in sequential order in accordance with a predetermined time relation, means controlled by the pressure of the water for setting said timing mechanism in operation, a pivoted magnetic element responsive to the earth's magnetic field and settable to a plurality of positions including an initial position, a firing position and an armed position, latitude setting means including a resilient member controlled by one of said circuit closing elements and operably connected to said magnetic element for causing the magnetic element to be moved from said initial position to the firing position and thereafter to be moved in a reverse direction to said armed position, firing contacts adapted to be closed when the magnetic element is moved to said firing position by said latitude setting means, means including a fusible retaining device operated by said firing contacts for causing the movement of said resilient member to be reversed, a slow acting electro-responsive device having circuit closing means, means effective when the magnetic element has been moved to said armed position for arresting said reverse movement of the resilient member, means effective as said resilient member is arrested by said arresting means for operatively connecting said firing contacts to the electro-responsive device, a slow releasing relay having normally closed contacts adapted to be disengaged as the relay operates, a pendulum device having electrical contact means adapted to operate said slow releasing relay as the mine is suddenly displaced, a detonating device, and means including another of said circuit closing elements of said timing mechanism and said normally closed contacts for rendering the electroresponsive device effective to operate said detonating device as the firing contacts are closed in response to a predetermined degree of strength in the magnetic field adjacent said magnetic element.

3. A submarine mine having a magnetic element responsive to changes in the strength of the earth's magnetic field and settable to different positions including an armed position and a firing position, means including gimbals for pivotally mounting the magnetic element for rotation about a horizontal axis, means including a resilient member for biasing said magnetic element, latitude setting means including clock mechanism controlled by the pressure of the liquid within which the mine is immersed for causing the magnetic element to be set by said resilient member to said firing position and thereafter to said armed position, means including a firing contact connected to said magnetic element and adapted to operate when the magnetic element is in said firing position, an electro-responsive device having means for delaying the closure of a circuit, means controlled by the latitude setting means as the magnetic element is moved into the armed position by said latitude setting means for operatively connecting said electro-responsive device to said firing contact means, a slow releasing relay having normally closed contacts adapted to be disengaged as the relay operates, means including a pendulum device for causing said slow releasing relay to operate as the mine is suddenly displaced, means including said normally closed contacts and an electrical contact actuated by said clock mechanism for rendering the electro-responsive device effective in delayed time relation to the setting of the magnetic element to said armed position, and a detonating device adapted to be operated by said circuit closure delaying means when the magnetic element is moved from said armed position to said firing position by a predetermined degree of change in the strength of the magnetic field adjacent the magnetic element.

4. In a magnetic mine adapted to be immersed within a body of water, a pivoted magnetic element selectively responsive to varying degrees of strength of the magnetic field adjacent thereto and having an armed position, an unarmed position and a firing position, contact means operatively connected to said magnetic element and adapted to be closed when the element is in said firing position, a slow releasing relay having a normally closed contact electrically connected to said contact means, a make contact on said relay adapted to close as the relay operates, means including a pendulum device for operating the relay as the mine is suddenly displaced, a first coil means electrically connected to said make contact and adapted to move the magnetic element into said unarmed position in response to the operation of said pendulum device, a second coil means adapted to maintain the contact means in closed condition as said magnetic element is moved into said firing position by a predetermined degree of change in the magnetic field adjacent the magnetic element, and slow acting means including a detonating device controlled jointly by the normally closed contact of said slow releasing relay and said contact means for causing the mine to explode as the magnetic element moves into said firing position.

5. In a magnetic mine adapted to be immersed within a body of water, a pivoted magnetic element selectively responsive to varying degrees of strength of the magnetic field adjacent thereto and having an initial position, an armed position and a firing position, contact means operatively connected to said magnetic element and adapted to be closed when the element is in said firing position, latitude setting means including a resilient member operably connected to said magnetic element for causing the magnetic element to be moved from said initial position to the firing position and thereafter to be moved to said armed position, a slow releasing relay having a normally closed contact and a make contact adapted to close as the relay operates, means including a pendulum device for operating the relay as the mine is suddenly displaced, contact closing mechanism controlled by the pressure of the water for rendering said pendulum and slow releasing relay effective, means controlled by the contact closing mechanism and said normally closed contact for setting the latitude setting means in operation, and means controlled by said make contact for causing the operation of said latitude setting means to be interrupted during the movement of the magnetic element from said initial position to said armed position.

6. In a submarine mine, a pivoted magnetic element selectively responsive to varying degrees of strength of the magnetic field adjacent thereto and having an unarmed position, an armed position and a firing position, contact means operatively connected to said magnetic element and adapted to be closed when the element is in said firing position, latitude setting means including a rotatable member yieldably connected to said magnetic element for causing the magnetic element to be moved from said initial position to the firing position and thence to said armed position, a slow releasing relay having normally closed contacts adapted to be disengaged as the relay operates, means including a pendulum for operating the relay as the mine is suddenly displaced, means including a fusible device operated by said normally closed contacts and the contact means as the magnetic element is moved into the firing position for reversing the direction of movement of said rotatable member, means including a circuit closing device momentarily operated by said rotatable member as the direction of movement thereof is reversed for positively disengaging said contact means, a time delay relay, means for operatively connecting said time delay relay to the contact means as the magnetic element is moved into said armed position, a detonating device, and means for causing the detonating device to be operated by said time delay relay as the magnetic element is subsequently moved from said armed position into the firing position by a predetermined degree of change in the magnetic field adjacent the magnetic element.

7. In a magnetic mine adapted to be submerged within a body of water, a timing device comprising a plurality of means for closing a plurality of circuits in sequential order in accordance with a predetermined time relation, a slow releasing relay having an armature operatively connected to one of said plurality of means, said armature having a normally closed contact and a normally open contact, means including a pendulum device for operating the relay as the mine is suddenly disturbed, a pivoted magnetic element selectively responsive to variations in the magnetic field adjacent thereto and settable to a plurality of different positions including an unarmed position, an armed position and a firing position, means including a resilient member for moving the magnetic element to said firing position and thereafter to said armed position, contact means adapted to be closed as the magnetic element is moved into said firing position, means including a coil in proximate relation to the magnetic element connected to the normally open contact of said slow releasing relay for moving the magnetic element to said unarmed position as the relay operates, means including a holding coil in circuit with the normally closed contact of said slow releasing relay for maintaining the contact means in closed condition as the magnetic element is subsequently moved into said firing position by a predetermined degree of change in the strength of the magnetic field adjacent the element, and means including a detonating device controlled by the normally closed contacts of said slow releasing relay and another one of said plurality of circuit closing means for causing the mine to explode in response to the last named closure of said contact means.

8. In a magnetic mine adapted to be immersed within a body of water, clock mechanism having a plurality of switch contacts operable in sequential order in accordance with a predetermined time relation, means controlled by the pressure of the water for setting said clock mechanism in operation, a magnetic element responsive to changes in the earth's magnetic field and settable to different positions including an unarmed position, an armed position and a firing position, means including a pivot for supporting said magnetic element, means for holding the magnetic element in locked disengagement from said pivot supporting means, a slow releasing relay having normally closed contacts adapted to be disengaged as the relay operates, a pendulum device having electrical contact means for operating the relay as the mine is suddenly displaced, latitude setting means including a resilient member connected to said magnetic element, means including a fusible retaining device controlled by the normally closed contacts of said slow releasing relay and at least one of said switch contacts for disengaging the holding means from said magnetic element and causing the magnetic element to be actuated to said firing position by the latitude setting means, electrical contacts adapted to be closed as the magnetic element is moved into the firing position, means including a fusible link operated by said electrical contacts for causing the magnetic member to be moved reversely from said firing position to said armed position, a hold off coil for actuating the magnetic element to said unarmed position, means actuated by said latitude means for momentarily energizing said hold off coil during the reverse movement of said magnetic element to said armed position, an adjustable stop member for arresting said latitude setting means when the magnetic member has been moved to said armed position, a slow acting relay controlled by another one of the switch contacts of said clock mechanism, a detonating device connected to said slow acting relay, and means for closing a circuit from said electrical contacts to the slow acting relay to cause the mine to be exploded by said detonating device under the control of the normally closed contacts of said slow releasing relay as the magnetic element is subsequently moved into said firing position by a predetermined change in the magnetic field adjacent the magnetic element.

9. In a magnetic mine adapted to be laid on the bed of a body of water, a pivoted magnetic element, a biasing spring connected to said magnetic element and selectively responsive to the earth's magnetic field, means settable at will for controlling the biasing spring to cause the magnetic element to be automatically set in an armed position at a predetermined sensitivity regardless of the latitude of the bed on which the mine is laid, contact means adapted to be closed when said magnetic element is moved to a predetermined setting by a change in the magnetic field adjacent the element, a slow releasing relay having normally closed contacts operatively connected to said contact means and a make contact adapted to close as the relay operates, means responsive to a sudden displacement of the mine for operating said slow releasing relay, means controlled by said make contact for preventing the closure of said contact means while the slow releasing relay is operated, a detonating device, and means controlled by the normally closed contacts of said slow releasing relay and said contact means for causing the mine to be exploded by said detonating device.

10. In a magnetic mine adapted to be laid on the bed of a body of water, a pivoted magnetic element movable to different positions in response to changes in the magnetic field adjacent thereto, yieldable control means, means settable at will for causing the element to be yieldably set by said control means in a position at a predetermined sensitivity regardless of the latitude of the bed on which the mine is laid, contact means adapted to be closed when said magnetic element is moved to a predetermined setting by a change in said magnetic field, a slow releasing relay having normally closed contacts operatively connected to said contact means and a make contact adapted to close as the relay operates, means responsive to a sudden movement of the mine for operating said slow releasing relay, means controlled by said make contact for preventing the closure of said contact means while the slow releasing relay is operated, detonating means, and means controlled by the normally closed contacts of said slow releasing relay and said contact means for causing the mine to be exploded by said detonating means.

11. In a magnetic mine adapted to be laid on the bed of a body of water, a magnetic element selectively responsive to changes in the earth's magnetic field, a biasing spring operatively connected to said magnetic element, adjustable means for causing a predermined direction of torque to be invariably applied to the magnetic element by said biasing spring, means for causing the biasing spring to set the magnetic element yieldably at a predetermined sensitivity regardless of the position of the mine on said bed or the latitude in which the mine is laid, contact means adapted to be closed when said magnetic element has been moved to a predetermined setting by a change in the magnetic field adjacent the element, a slow releasing relay having normally closed contacts operatively connected to said contact means and a make contact adapted to close as the relay operates, means responsive to a sudden movement of the mine for operating said slow releasing relay, means controlled by said make contact for preventing the closure of said contact means while the slow releasing relay is operated, a detonating device, means controlled by the normally closed contacts of said slow releasing relay and said contact means for causing the detonating device to explode the mine, and means settable at will for changing the rate of response of said magnetic element to said change in the magnetic field.

12. In a magnetic mine adapted to be laid on the bed of a body of water, the combination of a magnetic needle element having a supporting shaft secured thereto, contact means connected to said shaft and adapted to close when the magnetic element is in a predetermined firing position, means including gimbals for supporting said magnetic element and shaft for rotation in a vertical plane regardless of the position of said mine, a slow releasing relay having normally closed contacts operatively connected to said contact means and a make contact adapted to close as the relay operates, means responsive to a sudden movement of the mine for operating said slow releasing relay, means controlled by said make contact for preventing the closure of said contact means while the slow releasing relay is operated, means including a yieldable member controlled by said contact means for causing said magnetic element to be moved to a predetermined sensitivity setting regardless of the azimuth position of said shaft and magnetic element, detonating means, and means controlled by the normally closed contacts of said slow releasing relay and said contact means for causing the mine to be exploded by said detonating means as the magnetic element is moved from said sensitivity setting to said firing position by a change in the magnetic field adjacent the element.

13. In a magnetic mine adapted to be laid upon the bed of a body of water, timing mechanism having a plurality of circuit closing elements operable in sequential order in accordance with a predetermined time relation, means for setting said timing mechanism in operation, a pivoted magnetic element selectively responsive to changes in the magnetic field adjacent thereto and settable to a plurality of positions including an initial position, an armed position and a firing position, electrical contacts adapted to be closed as the magnetic element moves into said firing position, latitude setting means, means for maintaining said latitude setting means in continuous elastic connection with said magnetic element and controlled by one of said circuit closing elements for causing the magnetic element to be moved from said initial position to the armed position, a slow releasing relay having normally closed contacts adapted to be disengaged as the relay operates, means including a pendulum device for causing said slow releasing relay to operate as the mine is suddenly moved, a detonating device, and means controlled by another of said circuit closing elements of the timing mechanism and said normally closed contacts for causing the detonating device to operate in response to the closure of said electrical contacts as the magnetic element moves into said firing position by a predetermined degree of change in said magnetic field.

14. In a ground mine adapted to be laid on the bed of a body of water, a magnetic element selectively responsive to changes in the magnetic field adjacent thereto and settable to an armed position and a firing position, a pivoted shaft for supporting said magnetic element, means flexibly connected to the magnetic element for setting the element in said armed position, electrical contact means operatively connected to said magnetic element and adapted to be closed as the magnetic element moves into said firing position, a relay having operating means including an electro-magnet with a ferromagnetic core therein, means for energizing said electromagnet to cause the relay to operate as the mine is suddenly moved, means for mounting said relay in proximate relation to said magnetic element whereby the axis of said shaft is disposed in substantially symmetrical space relation with the magnetic field of said electro-magnet as the relay operates, means including coil structure disposed adjacent said magnetic element and controlled by the relay for preventing movement of the magnetic element into the firing position as the relay operates, and means including electrical circuit connections controlled by the relay for causing the field set up by said relay winding to assist said coil in preventing movement of the magnetic element into the firing position as the relay is operated by said energizing means.

15. A mine adapted to be laid on the bed of a body of water having a magnetic element selectively responsive to changes in the magnetic field adjacent thereto and settable to a plurality of positions including an armed position and a firing position, means including gimbals for pivotally supporting said magnetic element for rotation in a vertical plane regardless of the position of said mine, means controlled by the pressure of the water adjacent the mine for yieldably setting the magnetic element to said armed position, electrical contact means operatively connected to the magnetic element and adapted to be closed as the magnetic element is moved from said armed position to the firing position by a predetermined degree of change in the magnetic field adjacent the element, a relay having a winding with a ferromagnetic core therein supported by said gimbals in proximate space relation to said magnetic element such that the field set up by the winding tends to prevent the magnetic element from being set to said firing position while the relay is operated, means including pendulum structure for operating said relay as the mine is suddenly moved, mine detonating means, and means including contacts on said relay adapted to close as the relay releases for rendering said electrical contact means effective to cause the mine to be exploded by said mine detonating means as the magnetic element is moved into said firing position.

16. In a submarine mine, the combination of a rotatable magnetic needle responsive to changes in the magnetic field adjacent thereto and having means for closing an electrical circuit when moved into a firing position, a relay adapted to control said circuit closing means, said relay comprising an operating winding with a ferromagnetic core disposed adjacent said needle and in substantially intersecting relation with the axis of rotation of said needle, means including a yieldable connection controlled by said relay for automatically adjusting the setting of said needle to a predetermined sensitivity, and means controlled by said relay and said circuit closing means for detonating the mine when the magnetic needle has been moved from said sensitivity setting to said firing position by a predetermined change of the magnetic field adjacent the element.

17. In a submarine mine, the combination of a magnetic needle rotatable about an axis and selectively responsive to changes in the magnetic field adjacent thereto, means operatively connected to the needle for closing an electrical circuit as the needle is moved into a firing position, mine arming means, means including an electro-responsive relay for rendering said circuit closing means effective when the mine has been armed by said mine arming means, said relay having an operating winding with a ferromagnetic core disposed adjacent said needle and substantially parallel to the axis of rotation of the needle, means including a yieldable connection controlled by said relay for automatically adjusting the setting of said needle to a predetermined sensitivity, and means controlled by said relay and said electrical circuit closing means for detonating the mine when the magnetic needle has been moved from said sensitivity setting to said firing position by a predetermined change in the magnetic field adjacent said mine.

18. In a mine of the character disclosed, the combination of firing control mechanism adapted to be actuated by a change in the magnetic field adjacent the mine, an annular member having gimbals secured thereto for supporting said firing control mechanism in a predetermined adjusted position regardless of the position of the mine, means settable at will for adjusting the firing control mechanism to said predetermined position, means including a pendulum supported on said annular member for disabling said firing mechanism when the mechanism is moved from said predetermined position, a pair of substantially hemispherical covers detachably secured in sealed relation to opposite sides of said annular member thereby to enclose and protect said firing means and gimbals, a casing within said mine, and a pad composed of resilient material and enclosing said annular member and covers adapted to be inserted within said casing thereby to support said firing mechanism yieldably and prevent injury thereto as the mine is laid.

19. In a mine of the character disclosed, the combination of a control device adapted to be actuated to a firing position by a predetermined change in the magnetic field adjacent the mine, an annular member having gimbals secured thereto for supporting said firing control device in a predetermined adjusted position regardless of the position of the mine, means settable at will for adjusting the firing control mechanism to said predetermined position, means including a pendulum supported on said annular member for disabling said firing control device when the device is moved from said predetermined position, a pair of covers secured to said annular member for hermetically enclosing said firing control device, means including pad members composed of resilient material and enclosing said annular member and covers for yieldably supporting said firing control device within the mine to absorb the shock of impact as the mine is laid, mine detonating means having a firing circuit connected thereto, and means for extending said firing circuit through said pad and annular member to the firing control device to cause the mine to be exploded by said detonating means as the control device is actuated to said firing position.

20. In a mine of the character disclosed, a dip needle having electrical circuit closing means adapted to fire the mine as the needle is moved to a firing position, a relay operatively connected to said circuit closing means for disarming said mine as the relay operates, a pendulum bob having contact closing means adapted to operate said relay as the mine is suddenly moved, a pivot support for said pendulum bob, and means for yieldably connecting said pendulum bob to the pivot support thereby to prevent damage to said pivot support as the mine is laid.

21. In a mine of the character disclosed, the combination of firing control mechanism having magnetically controlled normally open circuit means constructed and arranged to be actuated to a closed position by a change in the magnetic field adjacent the mine, a firing circuit adapted to be closed by said circuit means, an annular member having gimbals secured thereto for supporting said firing control mechanism in a predetermined adjusted position regardless of the position of the mine, means settable at will for adjusting the firing control mechanism to said predetermined position, a relay having a pair of normally closed contacts included in said firing circuit, a pendulum on said firing control mechanism having a pair of normally open contacts operatively connected to said relay and adapted to operate the relay when the firing control mechanism is moved from said predetermined position thereby to render the firing circuit ineffective until the relay releases.

References Cited in the file of this patent
UNITED STATES PATENTS

| | | |
|---|---|---|
| 225,459 | Coloney | Mar. 16, 1880 |
| 1,310,568 | Heap et al. | July 22, 1919 |
| 1,382,374 | Maxim | June 21, 1921 |
| 1,451,107 | Palmer | Apr. 10, 1923 |
| 1,466,915 | Nichols | Sept. 4, 1923 |
| 1,471,628 | Palmer | Oct. 23, 1923 |
| 2,352,226 | Ronning | June 27, 1944 |